United States Patent
Brown

[15] 3,656,497
[45] Apr. 18, 1972

[54] PRESSURE REGULATOR

[72] Inventor: Hugh Clifford Brown, Thomaston, Conn.

[73] Assignee: Scovill Manufacturing Company, Waterbury, Conn.

[22] Filed: Oct. 9, 1970

[21] Appl. No.: 79,468

[52] U.S. Cl. ..................................... 137/116.5, 137/505.42
[51] Int. Cl. ....................................................... F16k 31/363
[58] Field of Search ..................... 137/116.5, 505.11, 505.42

[56] References Cited

UNITED STATES PATENTS

| 2,868,224 | 1/1959 | Karlsson et al. | 137/505.42 X |
| 167,212 | 8/1875 | Bates | 137/505.42 |
| 3,240,223 | 3/1966 | Vanderhorst | 137/505.42 X |

FOREIGN PATENTS OR APPLICATIONS

| 937,321 | 9/1963 | Great Britain | 137/116.5 |

Primary Examiner—Robert G. Nilson
Attorney—Dallett Hoopes

[57] ABSTRACT

Pressure regulator has a threaded tubular control stem which when turned adjusts its position relative to spring-pressed piston or the like. Inside end of stem unseats valve from high pressure inlet to admit flow up to set pressure, and an excessive downstream pressure build-up backs stem off its seat on valve to permit pop off through stem.

2 Claims, 6 Drawing Figures

INVENTOR
Hugh C. Brown
BY
ATTORNEY.

INVENTOR.
Hugh C. Brown
ATTORNEY.

PRESSURE REGULATOR

This invention relates to a pressure regulator. More specifically, this invention relates to a simple pressure regulator including a pop-off valve to bleed downstream excessive pressure. The regulator has an especially simple means for control.

The prior art is replete with pressure regulators of many descriptions. Some of the prior regulators include spring means providing a pop-off for downstream excessive pressure when it occurs. An example is U.S. Pat. No. 2,887,123. Prior devices, however, have often been complicated and involved the use of many springs and elaborate venting means.

The present invention is characterized by few parts, simple assembly and easy adjustment.

Other objects and features of the invention will be apparent to those skilled in the art from a reading of the following specification and reference to the drawings all of which disclose a non-limiting example embodying the invention. In the drawings.

Figures 1, 2:
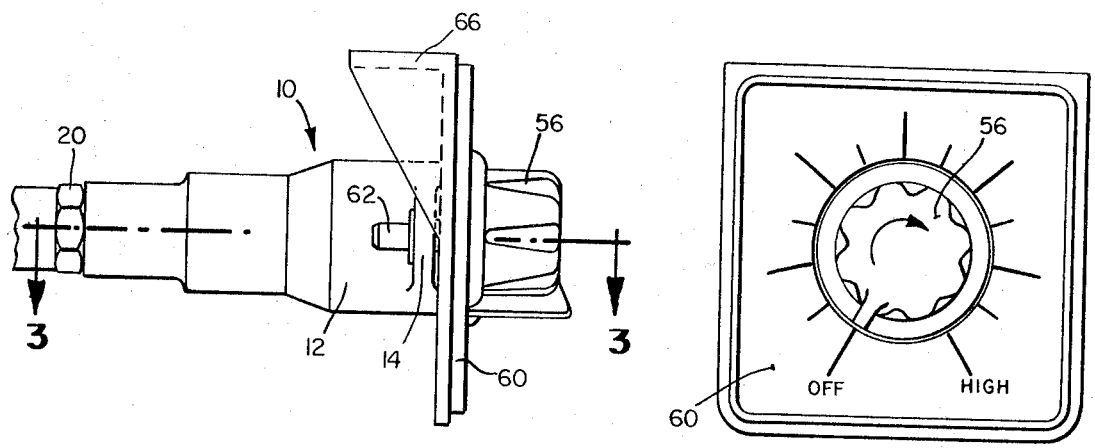
FIG. 1 is a front plan view of a control for a valve embodying the invention.
FIG. 2 is a side elevation of FIG. 1.

Referring more specifically to the drawings, the valve embodying the invention is shown in FIG. 2 and generally designated 10. It comprises the housing 12 of stepped diameters and includes mounting flanges 14, the inlet 16 for upstream port and the branched outlet or downstream port 18. Each of these ports is internally threaded and they receive threaded male fittings 20 and 22 respectively on the end of hoses.

Figure 3:
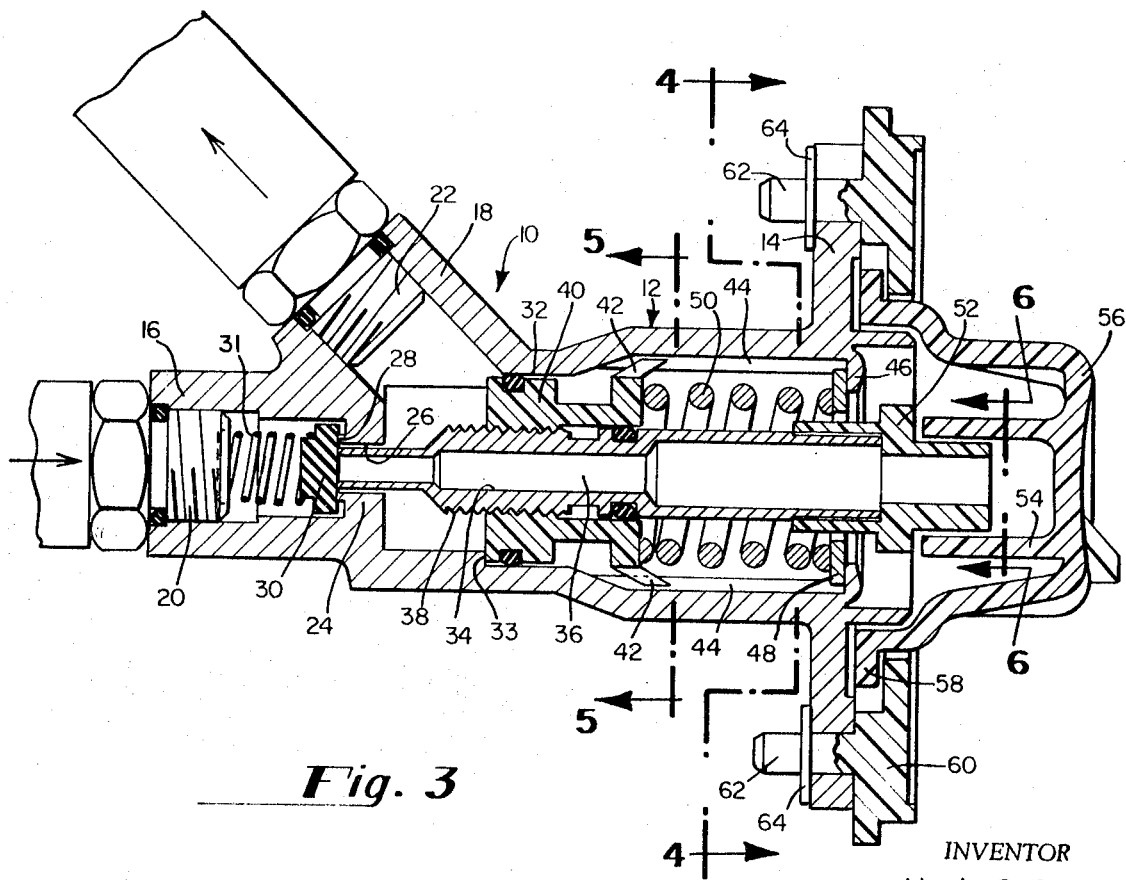
FIG. 3 is an enlarged sectional view taken on the line 3—3 of FIG. 2.

As shown in FIG. 3, the housing is formed with a partial partition 24 intermediate the two ports 16 and 18. The partition has an opening 26 about the leftward end of which (FIG. 3) is a raised valve seat 28. A valve member 30 is pressed against the seat by a spring 31 compressed between the valve and the inner end of the fitting 20.

A central portion 32 of the stepped housing 12 comprises a cylinder. A hollow stem 34 having an axial passage 36 is disposed axially of the housing and its smaller end normally abuts the valve 30. As shown, the stem 34 is threaded centrally as at 38. A piston 40 of annular configuration carries appropriate seals and engages the wall of the cylinder 32. The central opening in the piston is threaded and engages the threads 38 on the stem.

Figure 5:
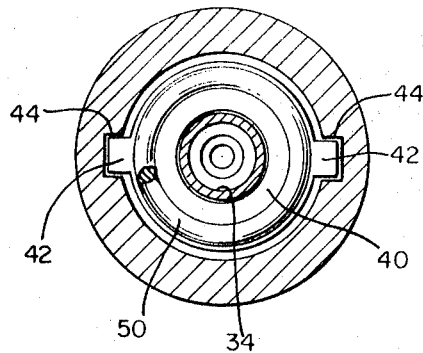
FIG. 5 is a sectional view taken on the line 5—5 of FIG. 3.

Extending outward from the rightward end of the piston are keys 42 (FIG. 5) which ride in splines 44 in the housing and thereby keep the piston from turning when the stem 34 is turned. As shown, sealing means are provided between the stem and the piston. An annular shoulder 33 in cylinder 32 limits leftward movement of the piston and stem at the "off" setting shown and at other settings limits the penetration of the stem into the opening 26.

The rightward end of the housing 12 is struck inward as at 46 about its opening and an annular retainer 48 is placed thereagainst. A control spring 50 is disposed compressively between the washer and the piston 40, and depending on the position of the piston 40, tends to exert a leftward force on the stem and hence on the valve 30.

Figure 6:
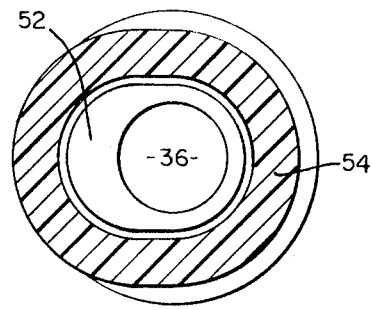
FIG. 6 is a sectional view taken on the line 6—6 of FIG. 3.

Means for turning the stem and thereby adjusting the position of the piston 40 along the stem comprise the plastic tubular dog 52 (FIG. 6) which is secured in a press fit about the knurled larger end of the stem. The dog has its distal end formed of oblong contour and is received freely into the central skirt 54 of a knob 56 with freedom for axial movement relative to the knob. The knob is formed with an outward peripheral flange 58 by which it is held in the central opening of a securing plate 60. The plate 60 is equipped with pins 62 which engage in holes in the mounting means 14. Rings 64 secure the two parts together. The plate is formed with a perpendicular mounting bracket 66.

Figure 4:
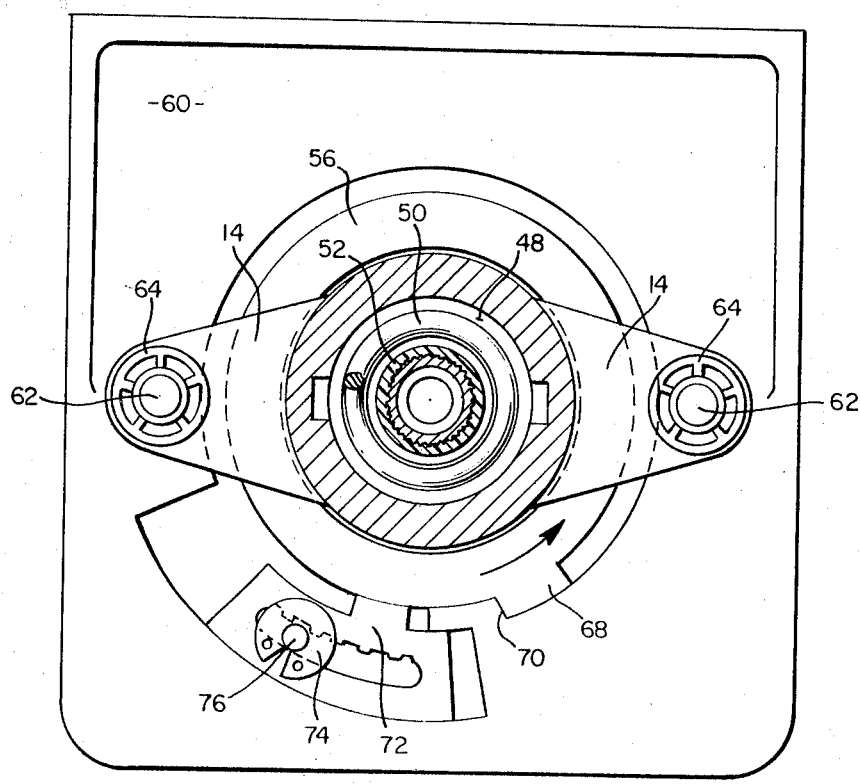
FIG. 4 is a sectional view taken on the line 4—4 of FIG. 3.

Stop means 68 (FIG. 4) extend outward from the flange 58 and at one end of the rotary travel of the knob 56, engage the stop shoulder 70 on the cover plate 60. At the other end of the travel, the stop means 68 engages the slide stop 72 which may be adjustably secured to the cover plate by the engagement of the bowed locking ring 74 receiving the pin 76.

The operation of the valve embodying the invention, once connected, is relatively simple. The position of the stem 34 in the piston is set by screwing it in or out with the rotation of the knob 56. The position will control the amount of extension of the stem 34 in the leftward direction. The farther to the left (FIG. 3) the stem is turned, the greater will be the force required to work on the leftward face of the piston 40 to close the valve 30 against spring 50.

With the stem 34 set in its selected position relative to the piston 40, air is supplied through the hose and fitting 20. Since at the commencement there is no air pressure working against the face of the piston 40, the spring 50 will displace the valve 30 from its seat 28. As pressure builds up inside the housing to the left of the piston 40, it will ultimately reach a point where the force working on the leftward face of the piston 40 exceeds the force of the spring 50 working against the rightward face (FIG. 3). This will cause the piston and stem to move to the right permitting the valve 30 to close. A subsequent drop in pressure inside the housing will reduce the rightward force on the piston 40 and enable the spring 50 to force the stem 34 to unseat the valve 30 until the proper pressure is again present.

With the valve 30 closed, should there suddenly occur an increase in pressure on the downstream side of the valve above the selected setting, the pressure will be communicated through fitting 22 and will create a force against the leftward face of the piston 40 (FIG. 3) to move the leftward end of the stem 34 entirely away from the valve 30 and permit air to pass through the opening 26 and then through the axial passage 36 of the stem through the knob 56 to atmosphere. When the pressure in the chamber subsequently drops to the desired pressure, spring 50 will move the stem 34 against the valve 30 and seat it there closing off the venting action.

Thus, there is an extremely simple structure presented. It is capable of easy adjustment by virtue of the advantageous mechanical ratio between the diameter of the threads 38 and the knob 56. It includes foolproof pop-off means to guard against increased pressures.

It should be understood that while a piston 40 has been shown in the embodiment of the drawings, it may be substituted by a diaphragm properly clamped to the wall of the housing and having a central nut, for instance, to which the stem may be threadedly secured. Other variations are possible within the scope of the invention defined in the following claim language:

I claim:

1. An air pressure regulating unit and relief valve comprising a housing having a high pressure chamber and a low pressure chamber each having passages to the outside of the housing, and formed with a port inbetween the chambers and a stem opening in the housing on the low pressure chamber side of the port and aligned with the port, a spring-biased valve normally closing the port from the high pressure side, a control stem having a longitudinal relief bore therethrough and having exterior threads, the stem extending through the stem opening, through the low pressure chamber and having its end normally engaging and seated on the valve, a piston defining the boundary of the low pressure chamber opposite the port and operable in said low pressure chamber, means holding the piston from rotation, the piston having central threaded opening means, fixed means limiting the movement of the piston toward the port, the stem threadedly engaging in the opening in the piston, and spring means surrounding the stem and compressed between the piston and the housing wall surrounding the stem opening, the stem terminating outside the housing in a distal end, a plastic dog having key means at its periphery and secured over the distal end in press fit, the dog having an aperture permitting a vent for the relief bore, a control knob having a body with central mounting ring having keyway means and receiving the dog in a relationship which interconnects the knob and shaft for rotary movement of the knob to the shaft but not longitudinal movement of the shaft to the knob, and fixed stop means associated with the housing for limiting the rotary movement of the knob to set minimum and maximum pressures in the regulated outlet from the low pressure chamber.

2. An air pressure regulating unit and relief valve as described in claim 1 wherein the housing has an outwardly extending mounting flange and the knob body has an outward peripheral flange, and an apertured coverplate receiving the knob body through its aperture, the coverplate and mounting flange loosely capturing between them the peripheral flange to retain the knob on the dog shaft assembly and still permit its rotation relative to the housing.

* * * * *